Patented Feb. 28, 1933

1,899,919

UNITED STATES PATENT OFFICE

MICHAEL N. DVORNIKOFF, OF ST. LOUIS, MISSOURI, ASSIGNOR TO MONSANTO CHEMICAL WORKS, OF ST. LOUIS, MISSOURI, A CORPORATION OF MISSOURI

MANUFACTURE OF MIXED ALKYL PHENYL ESTERS

No Drawing.    Application filed October 15, 1931. Serial No. 569,109.

This invention relates to the manufacture of mixed esters of polycarboxylic acids capable of forming inner anhydrides, which esters are characterized in that they include a phenyl and an alkyl group, such for example as—methyl-phenyl-phthalate.

Mixed alkyl esters such as methyl-ethyl-phthalate may be made conveniently by forming the mono ester of one of the alcohols and subsequently completing the esterification in the usual manner in the presence of a second alcohol. However, this method is not applicable to the manufacture of mixed alkyl phenyl esters.

Phenyl esters may be made conveniently by reacting an acid chloride with a phenol. Alcohol esters may be made in an analogous manner. However, when a mixture of a phenol and an alcohol is caused to react with an acid chloride of a dicarboxylic acid, one obtains the mixed alkyl phenyl ester together with the diphenyl ester and the di-alkyl ester.

The object of this invention is to provide a method of manufacturing in good yields mixed esters of polycarboxylic acids containing a phenyl and an alkyl group.

According to the present invention, the mono-alkyl ester of the polycarboxylic acid is formed in the usual manner after which the unreacted acid group is converted to an acid chloride group. The resulting acid chloride is then reacted with a phenol to form the mixed ester.

The following examples will serve to illustrate the present invention:

*Example 1.*—Methyl-phenyl-phthalate is prepared by treating the mono-methyl ester of phthalic acid with phosphorus trichloride whereby one obtains the acid chloride of mono-methyl phthalate which reacts readily with phenol to form the mixed ester. For this purpose, one part by weight of phthalic anhydride and 2.5 parts by weight of methanol are refluxed for three hours. The excess methanol is then distilled and the residue, consisting largely of mono-methyl-phthalate, is recrystallized from benzene (M. P. 83° C.). It is dissolved in benzene and heated on a water bath with phosphorus trichloride. The phosphorus acid by-product is decanted from the benzene solution of the acid chloride of mono-methyl-phthalate which is then filtered and subsequently reacted with an equimolar quantity of phenol whereby the mixed ester is formed which may be isolated conveniently by washing first with dilute caustic soda and finally with water. Upon elimination of the benzene by distillation, methyl-phenyl-phthalate remains, which may be purified conveniently by distillation under reduced pressures, its boiling point being 191° C. at 5 mm. pressure.

*Example 2.*—In lieu of phosphorus trichloride one may substitute an equal mol proportion of phthalyl chloride whereby the acid chloride of the mono-methyl ester is obtained, which may then be converted into the mixture of phenyl-methyl ester according to the procedure set forth in Example 1.

*Example 3.*—In Example 1 substitute an equal mol proportion of thionyl chloride for the phosphorus trichloride. The acid of the methyl ester results, which may be employed in the preparation of the mixed ester.

*Example 4.*—The corresponding mono-ethyl-ester of phthalic acid is substituted for mono-methyl ester in Example 1 to produce the corresponding acid chloride of mono-ethyl-phthalate, which is converted in an analogous manner to phenyl-ethyl-phthalate. After purification by distillation, it will be found to have a boiling point of 195° C. at 4 mm. pressure.

*Example 5.*—The mono-methyl ester of succinic acid may be prepared conveniently by reacting an excess of methanol with succinic anhydride and recrystallizing the product from benzene. The mono-methyl ester so obtained is dissolved in benzene, and is heated on a water bath with phosphorus trichloride. The resulting benzene solution may be decanted from the phosphorus acid and filtered before adding the molar equivalent of phenol. The mixture is allowed to stand for two hours and subsequently is refluxed for approximately an hour. The product is purified by washing with a dilute caustic solution and water. A benzene solution of methyl-phenyl-succinate results, which may be recovered and purified in the usual manner, B. P. 133° C. at 10 mm.

*Example 6.*—Methyl-cresyl-succinate may be prepared in a manner analogous to Example 5, by substituting cresol for phenol.

Although a number of examples of the application of the principles of the present invention are hereinabove set forth, the method is applicable to the manufacture of other mixed phenyl alcohol esters of polycarboxylic acids that have a tendency to form inner anhydrides. Such acids include: phthalic, chlorphthalic, maleic, succinic and others. Similarly, a wide variety of mono-hydric alcohols and phenols may be employed, including the normal as well as the secondary aliphatic alcohols, the cresols, xylols, guaiacol, naphthol, etc. Obviously, in lieu of the phenols, one may substitute the salts thereof, such as sodium phenate. The products obtained by practicing the present invention have properties which adapt them for a variety of uses, including the plasticization of cellulose esters and synthetic resins.

What I claim is:

1. The method of manufacturing mixed alkyl phenyl esters of polycarboxylic acids, which are capable of forming inner anhydrides, that comprises forming the acid chloride mono-alkyl ester of the acid and subsequently reacting such acid chloride ester with a phenol.

2. The method of manufacturing mixed alkyl phenyl esters of phthalic acid which comprises forming the acid chloride mono-alkyl esters of phthalic acid and subsequently reacting such acid chloride ester with a phenol.

3. The method of preparing mixed alkyl phenyl esters of succinic acid which comprises forming an acid chloride mono-alkyl ester of succinic acid and subsequently reacting such acid chloride ester with a phenol.

4. The method of manufacturing mixed alkyl phenyl esters of maleic acid which comprises forming the acid chloride mono-alkyl ester of maleic acid and subsequently reacting such acid chloride ester with a phenol.

In testimony whereof, I affix my signature.

MICHAEL N. DVORNIKOFF.